UNITED STATES PATENT OFFICE.

HENRY H. BEACH, OF ROME, NEW YORK.

ROASTED PEA-GRITS.

SPECIFICATION forming part of Letters Patent No. 261,803, dated July 25, 1882.

Application filed November 1, 1880. (No specimens.)

*To all whom it may concern:*

Be it known that I, HENRY H. BEACH, of Rome, Oneida county, in the State of New York, have invented a certain new and useful article of manufacture, which I denominate "Roasted Pea-Grits," of which the following is a specification.

The article in which my invention consists—viz., roasted pea-grits—is produced as follows: I take the unroasted pea, and by suitable known means grind or crush it into grits. This process, however, will necessarily result also in the production of pea bran and meal along with the grits, the bran and meal constituting an appreciable percentage of the entire quantity. I separate the bran and meal from the grits, and the latter I then roast in an apparatus similar to the ordinary coffee-roaster used in manufacturing-houses, save that the body of the roasting-cylinder is imperforate, the steam and smoke passing out from the cylinder through openings in the cylinder-heads at or near their centers.

I thus produce a new article of manufacture—roasted pea-grits—which can be put to any and all the uses for which the ordinary roast pea is required.

Among the resultant advantages of the method of manufacture is the saving of the bran and meal. This product is unavoidably produced in breaking up or crushing the peas, and by grinding before roasting the bran and meal are in condition to be used as food, whereas were the peas roasted before being ground the bran and meal resulting from the grinding would be of little or no use. Furthermore, the pea, when first reduced to grits, can be much more evenly and thoroughly roasted.

What I claim, and desire to secure by Letters Patent, is—

Roasted pea-grits, as a new article of manufacture.

In testimony whereof I have hereunto set my hand this 30th day of October, A. D. 1880.

HENRY H. BEACH.

Witnesses:
H. POLD,
S. WILSON.